United States Patent
Plostnieks

[15] 3,697,529
[45] Oct. 10, 1972

[54] ARALKYL PENTA-AND HEXAMETHYLENIMINE AND INTERMEDIATES THEREFOR

[72] Inventor: Janis Plostnieks, Philadelphia, Pa.
[73] Assignee: McNeil Laboratories, Inc.
[22] Filed: Jan. 28, 1971
[21] Appl. No.: 110,615

Related U.S. Application Data

[60] Division of Ser. No. 799,943, Feb. 17, 1969, Pat. No. 3,637,659, which is a continuation-in-part of Ser. No. 717,363, March 29, 1968, abandoned.

[52] U.S. Cl.....260/293.81, 260/239 BF, 260/293.82
[51] Int. Cl. ............................................C07d 29/24
[58] Field of Search.......260/239 BF, 293.81, 293.82

[56] References Cited

OTHER PUBLICATIONS

Bergel et al., J. Chem. Soc. 1944, 269– 272.

*Primary Examiner*—Henry R. Jiles
*Assistant Examiner*—G. Thomas Todd
*Attorney*—Salvatore R. Conte et al.

[57] ABSTRACT

The compounds are of the class of aralkyl penta- and hexa- methylenimines which are useful as anti-arrhythmic agents; and to certain intermediates useful in the syntheses of such methylenimines.

3 Claims, No Drawings

ARALKYL PENTA-AND HEXAMETHYLENIMINE AND INTERMEDIATES THEREFOR

This is a divisional application of my co-pending application Ser. No. 799,943, filed Feb. 17, 1969, now U.S. Pat. No. 3,637,659, which in turn is a continuation-in-part of application Ser. No. 717,363, filed Mar. 29, 1968, now abandoned.

This invention relates to novel aralkyl penta-and hexamethylenimines and, more particularly, to 1-R-2-aralkyl-(penta- and hexa)methylenimines having the formula:

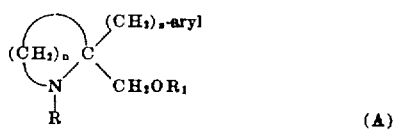

(A)

wherein $n$ is the integer 4 or 5; $z$ is an integer from 1 to 3; R is a member selected from the group consisting of hydrogen and lower alkyl; $R_1$ is a member selected from the group consisting of hydrogen and lower alkanoyl; and aryl is a member selected from the group consisting of phenyl an substituted phenyl in which the substituents of said substituted phenyl may be one or more members of the group consisting of halo, lower alkyl, lower alkoxy and m-trifluoromethyl; provided that:

i. when $R_1$ is lower alkanoyl, then R is hydrogen;
ii. when $z$ is 3, then aryl is phenyl, both R and $R_1$ are hydrogen and $n$ is 4; and
iii. when aryl is m-trifluoromethylphenyl, then $z$ is 2, both R and $R_1$ are hydrogen, and n is 4.

The therapeutically active, non-toxic acid addition salts of the foregoing compounds (A) are also embraced within the scope of this invention, as are several novel intermediates in the syntheses of said compounds (A).

As used herein, "lower alkyl" and "lower alkoxy" may be straight or branch chained saturated hydrocarbons having from one to about six carbon atoms, such as, for example, methyl, ethyl, propyl, isopropyl, butyl, pentyl, hexyl and the like alkyls, and respectively, the corresponding alkoxys such as methoxy, ethoxy, propoxy, isopropoxy, etc. Among the preferred "lower alkanoyl" groups are acetyl, propionyl and butyryl. The term "halo" refers to halogens of atomic weight less than 80, i.e., fluoro, bromo and chloro.

The compound of formula (A), wherein $z$ is 3, aryl is phenyl, $n$ is 4, and both R and $R_1$ are hydrogen, is named 2-(3-phenylpropyl)-2-piperidinemethanol and the procedure for preparing such compound is illustrated by Examples LVI through LVIII hereinafter; and the procedure for preparing that compound of formula (A) wherein aryl is m-trifluoro-methylphenyl, $z$ is 2, $n$ is 4, and both R and $R_1$ are hydrogen, namely, 2-[β-(3-trifluoromethylphenyl)ethyl]2-piperidine-methanol, is illustrated by Examples XLVIII through L hereinafter. It should be noted that the esters of Example LVII and Example XLIX, namely, ethyl 2-(3-phenylpropyl)-6-oxopipecolate and ethyl 2-[β-(3-trifluoromethylphenyl)ethyl]-6-oxopipecolate, respectively, are novel intermediates and, accordingly, both esters constitute an additional aspect of this invention.

The remaining compounds embraced within formula (A) may be structurally represented by the following formula:

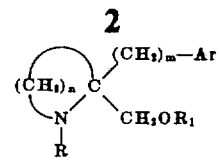

(I)

wherein $m$ is the integer 1 or 2, $n$ is the integer 4 or 5, R and $R_1$ are as previously defined and Ar is a member selected from the group consisting of phenyl and substituted phenyl in which the substituents of said substituted phenyl may be one or more members of the group consisting of halo, lower alkyl and lower alkoxy; provided that when said $R_1$ is lower alkanoyl, then said R is hydrogen.

The compounds of formula (I) are obtained by several processes. For example, those N-unsubstituted pentamethylenimine-2-methanol derivatives of formula (I) denoted as 2-aralkyl-2-piperidinemethanols and having the formula:

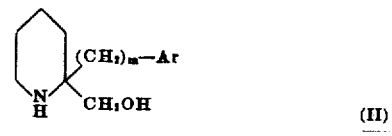

(II)

wherein $m$ equals 1 or 2 and Ar represents phenyl, halophenyl, lower alkylphenyl or lower alkoxyphenyl, may be prepared by the following synthetic sequence:

a. alkylating ethyl 2-oxocyclopentanecarboxylate, in the form of an alkali metal salt, with an appropriate aralkyl halide of the formula: halo—$(CH_2)_m$—Ar in a suitable organic solvent, e.g., dimethylformamide, dimethylsulfoxide and the like, to yield the corresponding ethyl 1-aralkyl-2-oxocyclopentanecarboxylate;

b. transforming the latter into an imino-expanded ring carboxylate, denoted as either ethyl 2-aralkyl-6-oxo-pentamethylenimine-2-carboxylate or ethyl 2-aralkyl-6-oxopipecolate, under the conditions of a Schmidt reaction, i.e., by contacting said ethyl 1-aralkyl-2-oxocyclopentanecarboxylate with hydrazoic acid in a suitable organic solvent, e.g., chloroform, benzene and the like, in the presence of a strong mineral acid, e.g., sulfuric acid; and c. reducing the imino carboxylic ester obtained from the previous step by means of a suitable reducing agent, e.g., lithium aluminum hydride, borane and the like, to yield the desired piperidinemethanol of formula (II).

The foregoing reaction sequence is also applicable to the production of the N-unsubstituted hexamethylenimine-2-methanol derivatives of formula (I) having the formula:

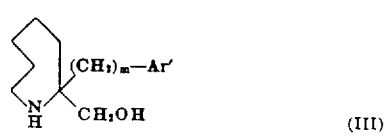

(III)

wherein $m$ equals 1 or 2, and Ar' is a member selected from the group consisting of phenyl, halophenyl and lower alkyl-phenyl. In such instance, alkylation step (a) begins with ethyl 2-oxocyclohexanecarboxylate and an aralkyl halide of the formula: halo—$(CH_2)_m$—Ar', and the thus-obtained ethyl 1-aralkyl-2-oxocyclohexanecarboxylate is transformed in step (b) to ethyl 2- aralkyl-7-oxo-hexamethylenimine-2-carboxylate which is then reduced in step (c) to the desired methanol of formula (III).

An alternative method of obtaining the aforementioned ethyl 2-aralkyl-6-oxo-pentamethylenimine-2-carboxylate is by converting the ethyl 1-aralkyl-2-oxo-cyclopentanecarboxylate obtained from step (a) into the corresponding ketone oxime by treatment with hydroxylamine and then transforming the thus-obtained ethyl 1-aralkyl-2-oximinocyclopentanecarboxylate into the desired pentamethylenimine carboxylate under Beckmann Rearrangement conditions, i.e., by vigorous treatment of the ketone oxime with an acidic reagent such as 85 percent sulfuric acid, polyphosphoric acid and the like.

The aforementioned ethyl 2-aralkyl-oxomethylenimine-2-carboxylates, which may be represented by the following formula are believed to be novel:

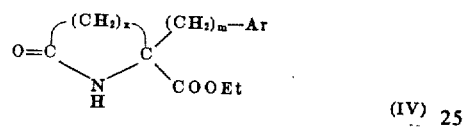

wherein $m$ is the integer 1 or 2, $x$ is the integer 3 or 4, and Ar is a member selected from the group consisting of phenyl, halophenyl, lower alkylphenyl and lower alkoxyphenyl, provided that, when $x$ is 4, said Ar is other than lower alkoxyphenyl. In view of their novelty and usefulness as intermediates for the syntheses described herein, such heretofore unknown compounds (IV) constitute an additional feature of this invention.

The following schematic diagram, exemplifying the preparation of formula (II) type compounds, illustrates the foregoing syntheses:

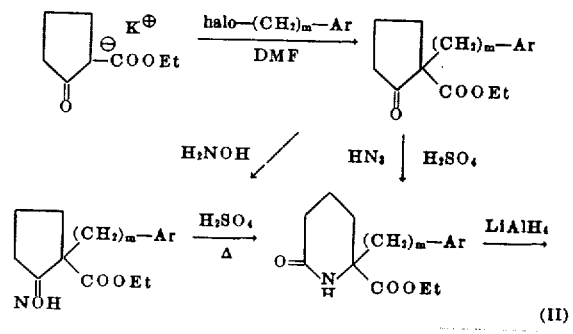

As an alternative to reduction step (c), the imino-expanded ring carboxylates obtained from step (b) may be converted into the corresponding methanols of formulas (II) and (III), when Ar and Ar' are other than halophenyl, by replacing the oxo function on the 6- or 7- position of the respective ethyl 2-aralkyl-oxomethylenimine-2-carboxylate with sulfur, for example, by contact with phosphorous pentasulfide in pyridine solution at temperatures generally at or above room temperature; desulfurizing the thus-obtained ethyl 2-aralkyl-6-thio-pentamethylenimine-2-carboxylate or ethyl 2-aralkyl-7-thio-hexamethylenimine-2-carboxylate, respectively, for example, by treatment with Raney nickel in a suitable organic solvent, e.g., a lower alkanol; and then reducing the thus-obtained ethyl 2-aralkyl-(penta- or hexa)methylenimine-2-carboxylate as previously described in step (c) to yield the respective methanols of formulas (II) and (III). As an alternative to this last-mentioned reduction step, said ethyl 2-aralkyl-(penta- or hexa)methylenimine-2-carboxylate may be de-esterified by conventional means, for example, by acidic hydrolysis of the ester function into the corresponding carboxy function, namely, 2-aralkyl-(penta- or hexa)methylenimine-2-carboxylic acid, which in turn may be reduced to the corresponding methanols of formulas (II) and (III) by means of a suitable reducing agent, for example, borane, lithium aluminum hydride and the like.

The foregoing reactions are further demonstrated in the following schematic diagram wherein the preparation of formula (II) type compounds are again exemplified; the Ar'' group being a member selected from the group consisting of phenyl, lower alkylphenyl and lower alkoxyphenyl:

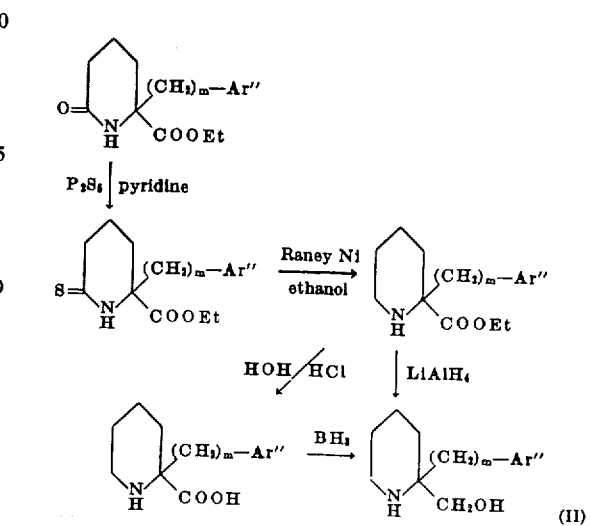

Another method of preparing the methanols of formula (I) starts with alkali metal salt of an alkyl N-acyl-(penta- or hexa)methylenimine-2-carboxylate, for example, the lithium salt of methyl or ethyl N-benzoyl-(penta- or hexa)methylenimine-2-carboxylate, which is alkylated with an aralkyl halide of the formula: halo—$(CH_2)_m$—Ar wherein $m$ equals 1 or 2 and Ar is a member selected from the group consisting of phenyl, halophenyl, lower alkylphenyl and lower alkoxyphenyl, in a suitable organic solvent, e.g., dimethoxyethane (DME), to yield the corresponding alkyl N-acyl-2-aralkyl-(penta- or hexa)methylenimine-2-carboxylate; the latter is then hydrolyzed under conventional acidic or alkaline conditions; and the thus-obtained 2-aralkyl-(penta- or hexa)methylenimine-2-carboxylic acid is reduced, for example, with borane, lithium aluminum hydride and the like, to the desired methanol of formula (I). Alternatively, said carboxylic acids may be esterified by conventional methods with lower alkanols to yield the corresponding alkyl esters which in turn may be reduced by contact with a suitable reducing agent, e.g., lithium aluminum hydride, to yield the corresponding methanols of formula (I). The foregoing reaction sequences may be illustrated by the following schematic diagram, again exemplifying the preparation of formula (II) type compounds:

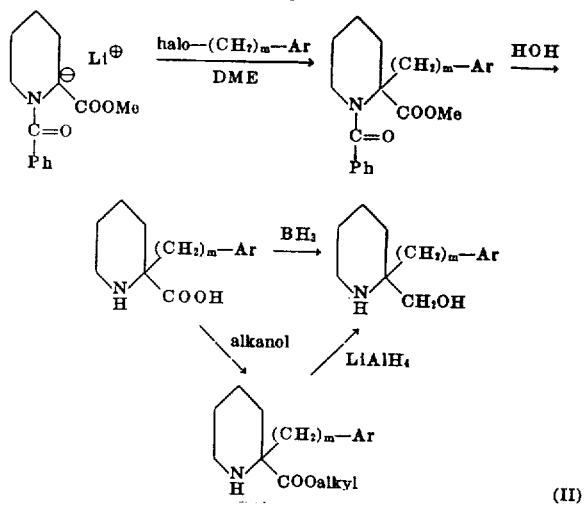

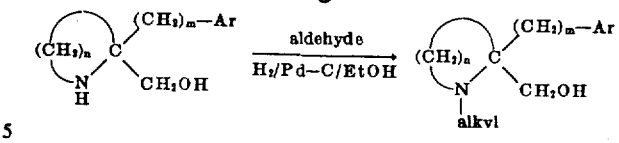

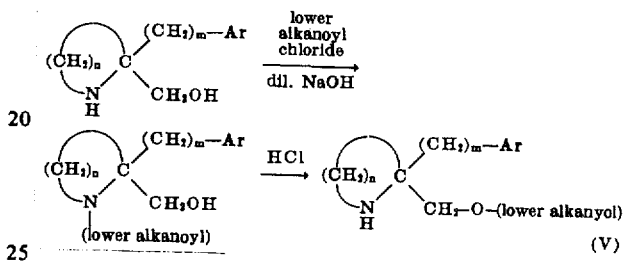

The O-acyl derivatives of formula (V), wherein $n$, Ar and $m$ are as previously defined, may be prepared by N-acylation under Schotten-Baumann reaction conditions of the appropriate N-unsubstituted 2-aralkyl-2-(penta- or hexa)methyleniminemethanol with a lower alkanoyl halide, preferably the chloride, in the presence of dilute alkali, followed by contact with an anhydrous mineral acid, e.g., ethereal hydrogen chloride, to effect an acyl migration to yield the desired O-acyl derivative (V):

The above acids and esters, namely, the 2-aralkyl-(penta- or hexa)methylenimine-2-carboxylic acids and lower alkyl 2-aralkyl-(penta- or hexa)methylenimine-2-carboxylates are novel compounds and may be represented by the following respective formulas:

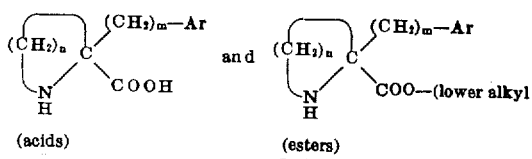

(acids)     (esters)

wherein $n$ is the integer 4 or 5, $m$ is the integer 1 or 2, and Ar is a member selected from the group consisting of phenyl, halophenyl, lower alkylphenyl and lower alkoxyphenyl. In view of their novelty and usefulness in the syntheses herein, such acids and esters constitute a further aspect of this invention.

The N-methyl derivatives of formula (I) are preferably prepared by contacting the corresponding N-unsubstituted 2-aralkyl-2-(penta- or hexa)methyleniminemethanol with formaldehyde in the presence of a strong mineral acid, preferably hydrochloric acid, to form the corresponding acid addition salt of a compound of the formula:

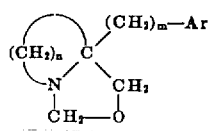

wherein $n$, $m$ and Ar are as previously defined, which salt is then treated with suitable alkali and the thus-obtained base form is subsequently reduced by means of a suitable reducing agent, e.g., lithium aluminum hydride, to the desired 2-aralkyl-N-methyl-2-(penta-or hexa)methyleniminemethanol:

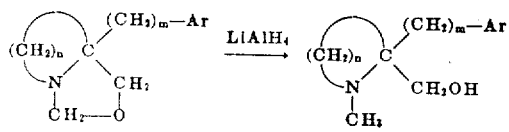

In the preferred method of preparing the N-alkyl derivatives of formula (I) other than N-methyl, the corresponding N-unsubstituted 2-aralkyl-2-(penta- or hexa)methyl-eniminemethanol is treated with an appropriate lower aldehyde under hydrogen pressure in the presence of a catalytic amount of palladium-on-charcoal in a suitable solvent, e.g., absolute ethanol.

The subject compounds (A) in base form are convertible to therapeutically active non-toxic acid addition salts by treatment with an appropriate acid such as, for example, an inorganic acid such as hydrohalic acid, e.g., hydrochloric, hydrobromic and hydriodic acid; sulfuric acid; nitric acid; a phosphoric acid; and the like, or an organic acid such as acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-amino-salicylic and the like acids. Conversely, the salt form can be converted in the usual manner by treatment with suitable alkali into the free base.

Due to the asymmetric center present in the subject compounds (A), it is evident that their existence in the form of resolved enantiomorphs is possible. It is naturally intended that such enantiomorphs are included within the scope of this invention.

The compounds of formula (A), in base or salt form have been found to possess valuable pharmacological properties. Such compounds are useful as anti-arrhythmic agents as demonstrated (see Example XLVI) by their ability to markedly decrease fibrillation in laboratory animals in dosages generally as low as 1–20 mg/kg body weight. These novel compounds can be administered in therapeutic dosages in conventional pharmaceutical formulations for oral and parenteral administration, for example, tablets, capsules, liquids, injectables and the like.

It has also been found that the lower alkyl 2-benzylpipecolates, in addition to being novel intermediates, also possess anti-arrhythmic activity similar to the compounds of formula (A). For example, when ethyl 2-benzylpipecolate is administered as the test compound in the procedure of Example XLVI, an MED of 5–10 mg/kg body weight is observed.

The following examples are intended to illustrate, but not to limit, the scope of the present invention.

EXAMPLE I

Ethyl 2-benzyl-6-oxo-pentamethylenimine-2-carboxylate:

A mixture of 100 ml. of concentrated sulfuric acid and 200 ml. of chloroform is cooled to −10° C. A chloroform solution (200 ml.) of hydrazoic acid is prepared using 32.5 g. (0.5 mole) of sodium azide and stored in an ice-bath. Ethyl 1-benzyl-2-oxocyclopentanecarboxylate (30.2 g., 0.125 mole) is dissolved in 100 ml. of chloroform and added to the hydrazoic acid solution. The combined chloroform solutions are added to the sulfuric acid mixture with vigorous stirring over a period of 1.25 hours, keeping the temperature of the reaction below −5° C. The evolution of nitrogen is followed by bubbling it through a beaker of water. After addition is complete, the reaction mixture is stirred in an ice-bath for an additional 0.5 hour. The reaction mixture is then poured carefully onto 700 g. of ice and the layers are separated. The organic layer is washed with water, dilute sodium hydroxide solution, and water. The solution is dried over anhydrous magnesium sulfate and the solvent is removed. The residue is crystallized from ether. Yield: 13.35 g. (0.051 mole) of ethyl 2-benzyl-6-oxo-pentamethyl-enimine-2-carboxylate (also named ethyl 2-benzyl-6-oxo-pipecolate) as a white solid, m.p. 88°–90° C., slowly turning pink upon exposure to the atmosphere. The slightly pink solid is dissolved in ethyl acetate and the solution is filtered through 30 g. of alumina. The solvent is removed and the residue is crystallized from ether giving 10.1 g. of ethyl 2-benzyl-6-oxo-pentamethylenimine-2-carboxylate as an almost white solid, m.p. 92°–93.5° C.

Analysis: Calcd. for $C_{15}H_{19}NO_3$: C, 68.94; H, 7.33; N, 5.36%

Found: C, 69.21; H, 7.21; N, 5047%

EXAMPLE II

2-Benzyl-2-piperidinemethanol:

Ethyl 2-benzyl-6-oxopipecolate (20 g., 0.08 mole) in 60 ml. of freshly distilled tetrahydrofuran is added dropwise to a suspension of 14 g., (0.38 mole) of lithium aluminum hydride in 300 ml. of tetrahydrofuran. The reaction is heated and stirred under reflux overnight. Water is added dropwise to decompose the excess reducing agent. Inorganic salts are removed by filtration. The water layer is extracted several times with ether. The ether solution is dried over anhydrous magnesium sulfate and evaporated in vacuo giving 13 g., (0.064 mole; 83 percent) of solid 2-benzyl-2-piperidinemethanol. The material is recrystallized from ethyl acetate, m.p. 113°–115° C. The m.p. of the corresponding hydrochloride acid addition salt is 225°–227° C.

Analysis: Calcd. for $C_{13}H_{19}NO$: C, 76.05; H, 9.33; N, 6.82%

Found: C, 76.03; H, 9.44; N, 7.09%

EXAMPLE III

Ethyl 1-(p-fluorobenzyl)-2-oxocyclopentane-carboxylate:

To a solution containing 144 g. (0.70 mole) of the potassium salt of ethyl-2-oxocyclopentanecarboxylate in 300 ml. of dimethylformamide is added 100 g., (0.70 mole) of 4-fluorobenzyl chloride. The reaction mixture is heated and stirred at 80° C. for 2 hours and then stirred at room temperature for 3 hours. The solvent is evaporated in vacuo and the residue is suspended in methylene chloride and washed with water several times. The organic layer is dried over anhydrous magnesium sulfate and evaporated in vacuo. The residue is distilled at 124°–129° C./5mm. giving 123 g. (0.46 mole; 67%) of ethyl 1-(p-fluorobenzyl)-2-oxocyclopentanecarboxylate.

Analysis: Calcd. for $C_{15}H_{17}FO_3$: C, 68.16; H, 6.48%

Found: C, 68.25; H, 6.54%

EXAMPLE IV

Ethyl 2-(p-fluorobenzyl)-6-oxo-pentamethylenimine-2-carboxylate:

The procedure of Example I is repeated except that an equivalent quantity of the product of Example III is used instead of the ethyl 1-benzyl-2-oxocyclopentanecarboxylate employed therein to yield as the product, ethyl 2-(p-fluoro-benzyl)-6-oxo-pentamethylenimine-2-carboxylate, m.p. 90°–94° C.

EXAMPLE V 2-(p-Fluorobenzyl)-2-piperidinemethanol:

Ethyl 2-(p-fluorobenzyl)-6-oxo-pentamethylenimine-2-carboxylate (21 g., 0.075 mole) in 150 ml. of freshly distilled tetrahydrofuran is added dropwise over 15 minutes to 300 ml. of tetrahydrofuran containing 12.8 g. (0.375 mole) of lithium aluminum hydride. The reaction is heated and stirred under reflux overnight. To decompose the excess reducing agent, 50 ml. of water is added dropwise. Inorganics are removed by filtration. The filtrate is extracted with 1N hydrochloric acid. The acid solution is made basic with 5 percent sodium hydroxide solution and extracted with ether. The organic layer is dried over anhydrous magnesium sulfate and evaporated in vacuo to give 11.34 g. (.052 mole; 69percent) of 2-(p-fluorobenzyl)-2-piperidinemethanol. After recrystallization from benzene, the melting point is 116°–118° C. A hydrochloride is prepared by the addition of ethereal hydrogen chloride, m.p. 205°–207° C.

Analysis: Calcd. for $C_{13}H_{19}ClFNO$: C, 60.11; H, 7.37; N, 5.39%

Found: C, 59.95; H, 7.25; N, 5.45%

EXAMPLE VI

By repeating the procedures of Examples III through V, except that an equivalent quantity each of 4-chlorobenzyl chloride and 3,4-dichlorobenzyl chloride is used as the alkylating agent in place of 4-fluorobenzyl chloride, and ether is used as the solvent in place of tetrahydrofuran in the procedure of Example V, there are obtained as final products the corresponding 2-(p-chlorobenzyl) and 2-(3',4'-dichlorobenzyl) derivatives, respectively, of 2-piperidine-methanol. The hydrochloride salt of the former has a m.p. of 199°–201° C.; and the HCl salt of the latter, 231°–233° C.

EXAMPLE VII

Ethyl 1-(p-methoxybenzyl)-2-oxocyclopentane-carboxylate:

To a solution containing 162.8 g. (0.84 mole) of the potassium salt of ethyl 2-oxocyclopentanecarboxylate in 600 ml. of dimethylformamide is added 130 g., (0.84 mole) of p-methoxybenzyl chloride. The reaction mixture is heated and stirred at 80° C. for 2 hours and let stand at room temperature overnight. The solvent is evaporated and the residue is dissolved in methylene chloride and washed with water several times. The organic layer is dried over anhydrous magnesium sulfate and evaporated in vacuo. The residue is distilled at 170°–180° C./10mm., giving 149.5 g., (.54 mole; 64 percent) of ethyl 1-(p-methoxybenzyl)-2-oxocyclopentane.

EXAMPLE VIII

Ethyl 2-(p-methoxybenzyl)-6-oxopipecolate:

A mixture of 58 ml. of concentrated sulfuric acid and 116 ml. of chloroform is cooled to −10° C. A chloroform solution (175 ml.) of hydrazoic acid is prepared using 29.5 g., (0.45 mole) of sodium azide. Ethyl 1-(p-methoxybenzyl)-2-oxocyclopentane-carboxylate (40 g., .015 mole) is dissolved in 100 ml. of chloroform and added simultaneously with the hydrazoic acid solution to the sulfuric acid mixture with vigorous stirring over a 30 minute period, keeping the temperature between −10° and 0°C. The evolution of nitrogen is followed by bubbling it through a beaker of water. After addition is complete, the reaction mixture is allowed to come to room temperature. The two liquid phases are separated, the chloroform phase is discarded and the sulfuric acid solution is poured over cracked ice and water and extracted with fresh chloroform. The organic layer is washed with water and a 5 percent sodium hydroxide solution, then dried over anhydrous magnesium sulfate, and the solvent removed. The residue is crystallized from ether giving 4.5 g. (0.016 mole) of ethyl 2-(p-methoxybenzyl)-6-oxopipecolate. After recrystallization from ethyl acetate-hexane, the m.p. is 87°–88°C.

EXAMPLE IX 2-(p-Methoxybenzyl)-2-piperidinemethanol:

Ethyl 2-(p-methoxybenzyl)-6-oxopipecolate (4.7 g., 0.016 mole) in 50 ml. of freshly distilled tetrahydrofuran is added dropwise for a 10 minute period to 150 ml., of freshly distilled tetrahydrofuran containing 3.55 g. (0.095 mole) of lithium aluminum hydride. The reaction is heated and stirred under reflux overnight. Water (15 ml.) is added dropwise to decompose the excess reducing agent. Inorganics are removed by filtration. The water layer is extracted several times with ether. The combined ether layers are dried over anhydrous magnesium sulfate and evaporated in vacuo. The resulting 2-(p-methoxybenzyl)-2-piperidinemethanol is converted to its fumarate salt giving 4.3 g., (.012 mole, 76 percent) of 2-(p-methoxybenzyl)-2-piperidinemethanol fumarate, m.p. 172°–174° C. Recrystallization from methanol and 2-propanol yields the pure fumarate, m.p. 173°–175°C.

Analysis: Calcd. for $[C_{14}H_{21}NO_2]_3[C_4H_4O_4]_2$:
  C, 63.51; H, 7.53; N, 4.38 percent
Found: C, 63.44; H, 7.60; N, 4.26 percent

EXAMPLE X

In accordance with the procedures of Examples VII through IX, except that an equivalent quantity each of p-ethoxy-benzyl chloride and m-methoxybenzyl chloride is used as the alkylating agent instead of p-methoxybenzyl chloride, and that the appropriate acid as hereinafter indicated is used in preparing the acid addition salt, the following respective final products are obtained:

2-(p-ethoxybenzyl)-2-piperidinemethanole lactate; and 2-(m-methoxybenzyl)-2-piperidinemethanol hydrochloride.

EXAMPLE XI

Ethyl 1-(p-methylbenzyl)-2-oxocyclopentane carboxylate is prepared by repeating the procedure of Example VII except that the reactants are 32 g. (0.18 mole) of the potassium salt of ethyl 2-oxocyclopentane carboxylate and 25.4 g. (0.18 mole) of α-chloro-p-xylene.

EXAMPLE XII

Ethyl 2-(p-methylbenzyl)-6-oxopipecolate is prepared by repeating the procedure of Example VIII except that the reactants are 42 g. (0.16 mole) of ethyl 1-(p-methylbenzyl)-2-oxocyclopentane carboxylate and 250 ml. of hydrazoic acid solution prepared from 30.5 g. (0.47 mole) of sodium azide, 30 ml. of water and 24 g. (0.24 mole) of conc. $H_2SO_4$. The yield of product, as a tannish powder, is about 13 grams.

EXAMPLE XIII 2-(p-methylbenzyl)-2-pyridinemethanol is prepared by the method described in Example II using 11.5 g. (0.3 mole) of lithium aluminum hydride and 13 g. (0.05 mole) of ethyl 2-(p-methylbenzyl)-6-oxopipecolate. The corresponding hydrochloride acid addition salt is prepared in 2-propanol with ethereal hydrogen chloride. After two recrystallizations from methanol-ether, the white solid hydrochloride salt melts at 190°–192°C.

Analysis: Calcd. for $C_{14}H_{21}NO \cdot HCl$: C, 65.74; H, 8.67; N, 5.48 percent
Found: C, 66.00; H, 8.60; N, 5.60 percent

EXAMPLE XIV

The procedures of Examples XI through XIII are repeated except that an equivalent quantity each of p-ethyl-benzyl chloride and α-chloro-p-xylene is used as the alkylating agent in place of α-chloro-p-xylene to yield, as final products, 2-(p-ethylbenzyl)-2-pyridinemethanol and 2-(m-methyl-benzyl)-2-pyridinemethanol, respectively, in the form of the hydrochloride salt.

EXAMPLE XV

Ethyl 1-benzyl-2-oxocyclohexane carboxylate is prepared by following the procedure described in Example VII starting with 42 g. (0.2 mole) of the potassium salt of ethyl 2-oxocyclohexane carboxylate and 25.5 g. (0.2 mole) of benzyl chloride as the alkylating agent. The pure product is distilled at 140°C./0.09mm.

EXAMPLE XVI

Ethyl 2-benzyl-7-oxo-hexamethylenimine-2-carboxylate is prepared by the procedure described in Example VIII starting with 42 g. (0.161 mole) of ethyl 1-benzyl-2-oxocyclohexane carboxylate and 350 ml. of hydrazoic acid solution prepared from 52 g. (0.8 mole) of sodium azide, 50 ml. of water, and 40 g. (0.4 mole) of conc. sulfuric acid. Warming at about 40°C. for about 0.5 hour is required. The crude product, about 27 g. of a dark red-amber oil, is crystallized from ether. Trituration with fresh ether affords the relatively pure product, m.p. 103°–104.5° C., as a pale tan powder.

EXAMPLE XVII

2-Benzyl-2-hexamethyleniminemethanol is prepared by repeating the procedure of Example II using 6.8 g. (0.18 mole) of lithium aluminum hydride and 8 g (0.03 mole) of ethyl 2-benzyl-7-oxo-hexamethylenimine-2-carboxylate in 300 ml. of anhydrous tetrahydrofuran. The product is treated with ethereal hydrogen chloride in ether and the thus-obtained hydrochloride salt is recrystallized once from methanol-ether and once from isopropanol-ether, m.p. 139°–141° C.

Analysis: Calcd. for $C_{14}H_{21}NO \cdot HCl$ : C, 65.74; H, 8.67; N, 5.46 percent
Found : C, 65.10; H, 8.55; N, 5.30 percent

EXAMPLE XVIII

The procedures of Examples XV through XVII are repeated except that an equivalent quantity of an appropriately substituted benzyl chloride is employed as the alkylating agent in place of the benzyl chloride used in example xv, and that the appropriate acid is used in preparing the acid addition salt hereinafter indicated, to yield the following final products:

2-(p-fluorobenzyl)-2-hexamethyleniminemethanol hydrochloride;
2-(p-isopropylbenzyl)-2-hex-amethyleniminemethanol oxalate; and
2-(3′,4′-dimethylbenzyl)-2-hex-amethyleniminemethanol hydrochloride.

EXAMPLE XIX

Ethyl 1-phenethyl-2-oxocyclopentanecarboxylate:

To a solution containing 17.7 g. (0.1 mole) of the potassium salt of ethyl 2-oxocyclopentanecarboxylate in 300 ml. of dimethylformamide is added 18.5 g. (0.1 mole) of phenethyl bromide. The reaction mixture is heated and stirred at 80° C. for 2 hours and let stand at room temperature over-night. The solvent is evaporated and the residue is dissolved in methylene chloride and washed with water several times. The organic layer is dried over anhydrous magnesium sulfate and evaporated in vacuo. The yield of oily product, distilled at 115°–124° C./0.1mm. is about 10.5 g.

EXAMPLE XX

Ethyl 2-phenethyl-6-oxopipecolate is prepared by repeating the procedure of Example VIII starting with 10.5 g. (0.04 mole) of ethyl 1-phenethyl-2-oxo-cyclopentane-carboxylate and 100 ml. of hydrazoic acid solution prepared from 16 g. (0.25 mole) of sodium azide, 16 ml. of water and 12.5 g. (0.125 mole) of conc. $H_2SO_4$. After the step of finally removing the solvent, the product is obtained as an oily residue which is used without further purification in Example XXI.

EXAMPLE XXI

2-Phenethyl-2-piperidinemethanol is prepared by repeating the procedure of Example II using 10 g. of lithium aluminum hydride and 9 g. of ethyl 2-phenethyl-6-oxopipecolate, as obtained from Example XX. The hydrochloride salt of 2-phenethyl-2-piperidinemethanol is prepared from ethereal hydrogen chloride in methanol-ether. After recrystallization from methanol-methyl ethyl ketone, the pure hydrochloride is obtained as a white solid, m.p. 152.5°–155° C.

Analysis: Calcd. for $C_{14}H_{21}NO \cdot HCl$ : C, 65.74; H, 8.67; N, 5.48 percent
Found : C, 65.55; H, 8.75; N, 5.59 percent

EXAMPLE XXII

A. By repeating the procedures of Examples XIX through XXI except that an equivalent quantity of an appropriately substituted phenethyl bromide is employed as the alkylating agent in place of the phenethyl bromide used in Example XIX, and that the appropriate acid is used in preparing the acid addition salt indicated below, the following final products are obtained:

2-(4′-methyl-phenethyl)-2-piperidinemethanol hydrobromide;
2-(4′-fluoro-phenethyl)-2-piperidinemethanol oxalate; and
2-(4′-methoxy-phenethyl)-2-piperidinemethanol hydrochloride.

B. The procedures of Examples XIX through XXI are repeated except that an equivalent quantity of ethyl 2-oxocyclohexanecarboxylate and an appropriately substituted phenethyl bromide are initially used to yield the following products in the form of a hydrochloride salt:

2-phenethyl-2-hexamethyleniminemethanol;
2-(4′-fluoro-phenethyl)-2-hex-amethyleniminemethanol;
2-(4′-methyl-phenethyl)-2-hex-amethyleniminemethanol.

EXAMPLE XXIII

A. Methyl N-benzoylpipecolate: Methyl pipecolate hydrochloride (65 g., 0.36 mole) is dissolved in 400 ml. of pyridine. The solution is cooled in an ice-bath and 63 g. (0.45 mole) of benzoyl chloride is added over a period of 30 minutes. The suspension is stirred at room temperature for 2 hours. Pyridine hydrochloride is removed by filtration. The filtrate is evaporated in vacuo. The residue is dissolved in a mixture of ether and water. The ether layer is washed successively with 1N hydrochloric acid, 5 percent potassium carbonate solution and water. The ether solution is dried over anhydrous magnesium sulfate and the solvent is removed in vacuo to give about 67 g. of an amber oil. The oil is purified by a chromatography on alumina to yield methyl N-benzoylpipecolate.

B. The 7-membered ring ester, ethyl N-benzoyl-2-hexa-methyleniminecarboxylate, is prepared as in Example XXXII–A by the benzoylation of an equivalent quantity of ethyl 2-hexahydro-azepinecarboxylate [see C.A. 64, 9697f (1966)].

EXAMPLE XXIV methyl N-benzoyl-2-benzylpipecolate: The solvent is removed in vacuo from 70 ml. (ca 0.07 mole) of an ether solution of methyl lithium. The residue is dissolved in 500 ml. of freshly distilled dry dimethoxyethane. Triphenyl-methane (17.0 g., 0.07 mole) IS DISSOLVED IN 70 ml. of dimethoxyethane and added to the methyl lithium solution over a period of 30 MINUTES. The darkening red solution is stirred at room temperature for 3 hours. Methyl N-benzoylpipecolate is slowly added to the solution until the deep red color changes to a lighter red-brown. The total amount added is 16.0 g. (0.065 mole). The reaction mixture is stirred at room temperature for 30 minutes. Freshly distilled benzyl chloride (8.2 g., 0.065 mole) is added and the reaction mixture is stirred at room temperature for 20 hours. The solvent is then removed in vacuo, and the residue is suspended in ether and washed with water. The ether solution is separated and dried over anhydrous magnesium sulfate and the solvent removed in vacuo yielding a dark oily residue containing methyl N-benzoyl-2-benzylpipecolate, which is used in Example XXV without further purification.

EXAMPLE XXV

2-Benzylpipecolic acid: The crude methyl N-benzoyl-2-benzylpipecolate obtained from Example XXIV is suspended in 200 ml. of 7N hydrochloric acid. The mixture is heated under reflux for 20 hours. The resulting dark suspension is cooled and extracted with ether. The water layer is decolorized with charcoal and the solvent is removed. The residue is dissolved in 30 ml. of water and slowly neutralized with dilute ammonia solution. The resulting precipitate, 2-benzylpipecolic acid, is removed by filtration and washed with acetone. The yield is 2.1 g. of a slightly tan solid, m.p. 380°C. (dec.).

EXAMPLE XXVI

A. The alkylation procedure of Example XXIV and the hydrolysis procedure of Example XXV are repeated except that an equivalent quantity each of p-fluorobenzyl chloride, p-methoxybenzyl chloride, 3,4-dichlorobenzyl chloride, phenethyl bromide, p-fluorophenethyl bromide and p-methylbenzyl chloride is used as the alkylating agent in place of the benzyl chloride used in Example XXIV to yield as final products the corresponding 2-(p-fluorobenzyl), 2-(p-methoxybenzyl), 2-(3',4'-dichlorobenzyl), 2-phenethyl, 2-(p-fluorophenethyl) and 2-(p-methylbenzyl) derivative, respectively, of pipecolic acid.

B. By repeating the procedures of Examples XXIV and XXV, except that an equivalent quantity of ethyl N-benzoyl-2-hexamethyleniminecarboxylate is alkylated with an appropriate aralkyl halide, the following products are obtained:
2-benzyl-2-hexamethyleniminecarboxylic acid;
2-(p-chlorobenzyl)-2-hexamethyleniminecarboxylic acid;
2-(p-methylbenzyl)-2-hexamethyleniminecarboxylic acid;
2-phenethyl-2-hexamethyleniminecarboxylic acid;
2-(p-fluoro-phenethyl)-2-hexamethyleniminecarboxylic acid; and
2-(4'-methoxy-phenethyl)-2-hexamethyleniminecarboxylic acid.

EXAMPLE XXVII

2-Benzyl-2-piperidinemethanol: 2-Benzylpipecolic acid (0.20 g., 0.0009 mole) is suspended in 15 ml. of 1M borane solution. The suspension is heated under reflux for one hour, during which time a solution is formed. The solution is cooled on an ice-bath and the excess borane is decomposed with 1N hydrochloric acid. Water and ether are added and the layers are separated. The water layer is made basic and extracted with ether. The ether solution is dried over anhydrous magnesium sulfate and the solvent is removed in vacuo, yielding 2-benzyl-2-piperidinemethanol as a white solid, m.p. 111°–115° C. Recrystallization from ethyl acetate raises the m.p. to 113°–115° C.

EXAMPLE XXVIII

The reduction procedure of Example XXVII is followed except that an equivalent quantity of each of the 2-aralkyl-pipecolic acids obtained in Example XXXVI-A and the 2-aralkyl-2-hexamethyleniminecarboxylic acids obtained in Example XXVI-B is used in place of 2-benzyl-pipecolic acid to yield as respective products the corresponding 2-aralkyl-2-(penta- or hexa)methyleniminemethanols.

EXAMPLE XXIX

A. Ethyl 2-Benzylpipecolate: 2-Benzylpipecolic acid (1.0 g.) is dissolved in 20 ml. of ethanolic hydrogen chloride and heated overnight under reflux. The solution is concentrated in vacuo and the product, ethyl 2-benzylpipecolate hydrochloride, is crystallized by addition of ether. Treatment of the salt with alkali affords the corresponding base, ethyl 2-benzylpipecolate.

B. By repeating the procedure of Example XXIX-A, except that an equivalent quantity of each of the acids obtained in Example XXVI (A and B) is used in place of the 2-benzylpipecolic acid used therein, the corresponding alkyl esters, i.e., ethyl 2-aralkyl-2-(penta- and hexa)methyleniminecarboxylates, are obtained as respective products.

EXAMPLE XXX

Ethyl 1-benzyl-2-oximinocyclopentanecarboxylate: Ethyl 1-benzyl-2-oxocyclopentanecarboxylate (12.0 g., 0.049 mole) is dissolved in 25 ml. of ethanol and 15 ml. of pyridine. Hydroxylamine hydrochloride (7.0 g., 0.1 mole) is added and the resulting solution is heated under reflux for 2 hours. The solvent is removed and the residue is dissolved in a mixture of ether and water. The layers are separated and the organic layer is washed with 1N hydrochloric acid and then water. The solution is dried over anhydrous magnesium sulfate and the solvent is removed under vacuum giving about 12.1 g. of a colorless oil. Crystallization from n-hexane yields 9.3 g. (0.0355 mole; 73 percent) of ethyl 1-benzyl-2-oximinocyclo-pentanecarboxylate as a white solid, m.p. 94.5°–97.5° C. Recrystallization from n-hexane raises the m.p. to 97°–98° C.

Analysis: Calcd. for $C_{15}H_{19}NO_3$: C, 68.94; H, 7.33; N, 5.36 percent
Found: C, 68.75; H, 7.27; N, 5.23 percent

EXAMPLE XXXI

Ethyl 2-benzyl-6-oxopipecolate: Polyphosphoric acid (130 g.) is heated to 110° C. Ethyl 1-benzyl-2-oximinocyclo-pentanecarboxylate (10 g., 0.0385 mole) is ground to a fine powder and added to the vigorously stirred acid. During the addition, the temperature of the reaction mixture rises to 150° C., at which temperature it is kept for 10 minutes. The hot mixture is slowly poured over 500 ml. of ice-water and extracted with ether. The ether extracts are dried over magnesium sulfate and the solvent is evaporated in vacuo. The resulting light amber oil is crystallized from ether giving about 2.8 g. of ethyl 2-benzyl-6-oxopipecolate as a white solid, m.p. 91.5°–92.5° C. Recrystallization from ethyl acetate-hexane raises the m.p. to 92.5°–93.5° C.

EXAMPLE XXXII

By repeating the procedures of Examples XXX and XXXI, except that an equivalent quantity of an appropriate ethyl 1-aralkyl-2-oxopentanecarboxylate is used in place of the corresponding 1-benzyl derivative of Example XXIII, the following respective products are obtained:
 ethyl 2-(p-fluorobenzyl)-6-oxopipecolate;
 ethyl 2-(p-methoxybenzyl)-6-oxopipecolate; and
 ethyl -2-(p-methylbenzyl)-6-oxopipecolate.

EXAMPLE XXXIII

Ethyl 2-benzylpipecolate: Ethyl 2-benzyl-6-thiopipecolate is prepared by suspending 13 g. (0.05 mole) of ethyl 2-benzyl-6-oxopipecolate and 13 g. (0.06 mole) of phosphorus pentasulfide in 100 ml. of pyridine. The reaction is heated under reflux for 20 minutes. The reaction mixture is poured onto ice-water and made basic (pH 9) with potassium hydroxide. The basic solution is extracted with ether several times. The organic layer is washed with water, dried over anhydrous magnesium sulfate and evaporated in vacuo giving about 5.5 g. of ethyl 2-benzyl-6-thiopipecolate as a brown oil. This is dissolved in 200 ml. of absolute ethanol and to this solution is added 60 g. of ethanol-washed Raney nickel. The mixture is stirred at room temperature for 1 hour and heated under reflux for 30 minutes. The catalyst is removed by filtration and the solvent evaporated in vacuo. The residue is dissolved in ether and treated with ethereal hydrogen chloride to give 3.8 g. (0.012 mole; 24 percent) of ethyl 2-benzylpipecolate hydrochloride, m.p. 206–207°C.
 Analysis: Calcd. for $C_{15}H_{20}ClNO_2$ : C, 62.83; H, 7.74; N, 4.89 percent
 Found : C, 62.92; H, 7.87; N, 4.86 percent

EXAMPLE XXXIV

2-Benzylpipecolic acid: 3.8 Grams of ethyl 2-benzylpipecolate is dissolved in 100 ml. of 9N HCl The solution is heated overnight under reflux. The solvent is evaporated off and the residue dissolved in water. The solution is neutralized with dilute ammonium hydroxide solution and the product, 2-benzylpipecolic acid, is filtered off, m.p. 380° C. (dec.), white crystals.

EXAMPLE XXXV

By repeating the procedures of Examples XXXIII and XXXIV, except that an equivalent quantity of the 2benzyl) and 2-(p-methoxybenzyl) derivative of 6-oxopipecolate is used as the starting material, there are obtained as respective products: 2-(p-methylbenzyl)-pipecolic acid and 2-(p-methoxybenzyl)-pipecolic acid.

EXAMPLE XXXVI

2-Benzyl-2-piperidinemethanol: 1 Gram of ethyl 2-benzylpipecolate is dissolved in 20 ml. of 1,2-dimethoxy-ethane. Lithium aluminum hydride (0.5 g.) is added and the reaction mixture is heated under reflux overnight. The excess hydride is decomposed by slow addition of water. Inorganic salts are removed by filtration. The water layer is extracted several times with ether. The ether solution is dried over anhydrous magnesium sulfate and evaporated in vacuo to yield the product, 2-benzyl-2-piperidinemethanol.

EXAMPLE XXXVII

The reduction procedure of Example XXXVI is repeated, except that an equivalent quantity of each ester obtained in Example XXXIX-B is used as the starting material to be reduced, and, when the 2-benzyl moiety contains a chloro substituent, ether is used as the solvent instead of 1,2-dimethoxyethane, to yield the corresponding 2-aralkyl-2-(penta- and hexa)-methyleniminemethanols as respective products.

EXAMPLE XXXVIII

8a-Benzyl-3H-oxazalo[3,4a]piperidine: To a stirred suspension of 9g. (0.044 mole) of 2-benzyl-2-piperidine-methanol in 50 ml. of water is added concentrated hydrochloric acid to pH 5–6. To the resulting solution is added 125 ml. of aqueous 37 percent formaldehyde and the mixture is stirred on a steam bath for 2 hours. After cooling, hydrochloric acid is added to pH 3–4 and the mixture is washed with ether. The aqueous layer is cooled and basified with 50 percent sodium hydroxide solution. The resulting gum is extracted with ether, the extract dried over anhydrous magnesium sulfate, and concentrated in vacuo to yield oily 8a-benzyl-3H-oxazolo[3,4a]piperidine, which is used without further purification in Example XXXV.

EXAMPLE XXXIX

2-Benzyl-N-methyl-2-piperidinemethanol: To a stirred suspension of lithium aluminum hydride (2.7 g., 0.07 mole) in 250 ml. of anhydrous ether is added dropwise a solution of 7.5 g. (0.035 mole) of 8a-benzyl-3H-oxazalo[3,4a]-piperidine in 50 ml. of anhydrous ether over a period of 15 minutes. The mixture is stirred at room temperature for 2 ½ hours and allowed to stand overnight. Water is added (12 ml.) slowly and dropwise with stirring. Anhydrous magnesium sulfate is added and the suspension filtered. Concentrating in vacuo gives 7.8 g. of crude 2-benzyl-N-methyl-2-piperidinemethanol as an oil. The hydrochloride is prepared in anhydrous ether with ethereal hydrogen chloride. Trituration with acetone yields about 6.2 g. of the crude hydrochloride, m.p. 165°–167° C. Recrystallization from methanol and acetone yields the pure hydrochloride, m.p. 166°–168° C. as a white solid.

Analysis: Calcd. for $C_{14}H_{22}NOCl$: C, 65.74; H, 8.67; N, 5.48 percent
Found: C, 65.68; H, 8.59; N, 5.54 percent

EXAMPLE XL

By repeating the procedures of Examples XXXVIII and XXXIX, except that an equivalent amount of the appropriate N-unsubstituted 2-aralkyl-(penta- or hexa)methyleniminemethanol is used as the starting material, the following final products are obtained:

2-(p-fluorobenzyl)-N-methyl-2-piperidinemethanol;
2-(p-methoxybenzyl)-N-methyl-2-piperidinemethanol;
2-phenethyl-N-methyl-2-piperidinemethanol;
2-benzyl-N-methyl-hexamethyleniminemethanol;
2-(p-fluorobenzyl)-N-methyl-hexamethyleniminemethanol;
2-phenethyl-N-methyl-hexamethyleniminemethanol; and
2-(p-isopropylbenzyl)-N-methyl-hexamethyleniminemethanol.

EXAMPLE XLI

2-Benzyl-1-n-butyl-2-piperidinemethanol: A solution of 7.0 g. (0.034 mole) of 2-benzyl-2-piperidinemethanol and 2.8 g. (0.039 mole) of n-butyraldehyde in 200 ml. of absolute ethanol is shaken under a hydrogen pressure of 40 psi at 50° C. for 24 hours with 0.5 g. of 10 percent palladium-on-charcoal catalyst. The mixture is cooled and the catalyst filtered off. The filtrate is concentrated in vacuo to an oily residue which is dissolved in 250 ml. of ether and extracted with 2 × 100 ml. of 10 percent hydrochloric acid. After washing the combined acid solutions with ether, the aqueous layer is made basic with 50 percent sodium hydroxide solution. The resulting gum is extracted with 2 × 200 ml. portions of ether, dried over anhydrous magnesium sulfate, and concentrated in vacuo. The oily product, 2-benzyl-1-n-butyl-2-piperidinemethanol, is isolated by dry column chromatography on silica and characterized as its hydrochloride, m.p. 174°–177° C. (from ethyl acetate).
Analysis: Calcd. for $C_{17}H_{27}NO \cdot HCl$: C, 68.55; H, 9.47; N, 4.70 percent
Found: C, 68.45; H, 9.40; N, 4.69 percent

EXAMPLE XLII

In accordance with the procedure outlined in Example XLI, except that an equivalent quantity of the appropriate aldehyde and of the appropriate N-unsubstituted 2-aralkyl-2-piperidinemethanol are used, the following N-alkyl methanols of formula (I) are obtained:

2-benzyl-1-n-propyl-2-piperidinemethanol;
2-phenethyl-1-n-butyl-2-piperidinemethanol;
2-(p-methoxybenzyl)-1-n-butyl-2-piperidinemethanol;
2-(p-fluorobenzyl)-1-ethyl-2-piperidinemethanol;
2-(p-methylbenzyl)-1-n-propyl-2-piperidinemethanol;
2-benzyl-1-n-butyl-2-hexamethyleniminemethanol;
2-(p-fluorobenzyl)-1-ethyl-2-hexamethyleniminemethanol; and
2-phenethyl-1-ethyl-2-hexamethyleniminemethanol.

EXAMPLE XLIII

2-Benzyl-2-piperidinemethyl acetate hydrochloride: To a solution of 5.6 g. (0.026 mole) of 2-benzyl-2-piperidine-methanol in 40 ml. of methylene chloride is added 1.6 g. (0.02 mole) of sodium hydroxide in 20 ml. of water. The mixture is stirred and cooled in an ice-bath while a solution of 2.4 g. (0.03 mole) of acetyl chloride in 10 ml. of methylene chloride is added dropwise over a 5 minute period. The mixture is stirred at 0°–10 C. for 1 ½ hours. The layers are separated and the organic phase is dried over anhydrous magnesium sulfate. Concentrating in vacuo yields about 8.8 g. of the oily N-acetyl intermediate. The oil is dissolved in 150 ml. of anhydrous ether and ethereal hydrogen chloride is added dropwise (50 ml.) while stirring. The suspension is stirred for two hours and filtered. The crude hydrochloride is recrystallized twice from methanol-ether to yield about 6.3 g. of pure 2-benzyl-2-piperidinemethyl acetate, a white solid melting at 222°–224° C.
Analysis: Calcd. for $C_{15}H_{21}NO_2 \cdot HCl$: N, 4.94 percent
Found: N, 4.79 percent

EXAMPLE XLIV

The O-acylation procedure of Example XLIII is repeated except that an equivalent quantity of an appropriate lower alkanoyl chloride acylating agent and an equivalent quantity of an appropriate 2-aralkyl-2-(penta- or hexa)methyl-eniminemethanol are used to yield the following respective products in the form of a hydrochloride salt:

2-benzyl-2-piperidinemethyl propionate;
2-phenethyl-2-piperidinemethyl acetate;
2-(p-fluorobenzyl)-2-piperidinemethyl acetate;
2-(p-methoxybenzyl)-2-piperidinemethyl butyrate;
2-benzyl-2-hexamethyleniminemethyl acetate;
2-(p-methylphenethyl)-2-hexamethyleniminemethyl acetate; and
2-(p-fluorobenzyl)-2-hexamethyleniminemethyl acetate.

EXAMPLE XLV

Resolution of 2-benzyl-2-piperidinemethanol: 2-Benzyl-2-piperidinemethanol (13.17 g., 0.064 mole) and d-mandelic acid (9.75 g., 0.064 mole) are dissolved in 250 ml. of acetone and the thus-formed salt is allowed to crystallize. After cooling to about 5°–15° C., the product is filtered off, yielding about 9.8 g. of a white solid. Three recrystallizations from acetone yields about 5.8 g. of the (+) salt, m.p. 161°–162.5° C., $\alpha_D$= +42.8°. The (+) mandelate is dissolved in water, made basic with sodium hydroxide and extracted with methylene chloride. The solution is dried over anhydrous magnesium chloride and the solvent removed in vacuo giving the (+)-2-benzyl-2-piperidinemethanol as a white solid. Recrystallization from ethyl acetate-n-hexene gives 2.5 g. of white needles, m.p. 115.5°–117° C., $\alpha_D$ = +8.23°.

The original mother liquor from the crystallization of the (+) salt is evaporated. The residue is dissolved in water, made basic with sodium hydroxide and extracted with methylene chloride. The solution is dried over anhydrous magnesium sulfate and the solvent is removed in vacuo. The residue is dissolved in 200 ml. of acetone. l-Mandelic acid (5.55 g., 0.0365 mole) is added and, after dissolution, the salt is allowed to crystallize (yield 9.74 g.). Four recrystallizations from acetone give about 4.5 g. of the (−) salt, m.p. 161.5°–163°C., $\alpha_D = -43.10°$. The (−) mandelate is treated with base as before to give the (−) -2-benzyl-2-piperidinemethanol as a white solid. Recrystallization from ethyl acetate-n-hexane affords about 1.73 g. of white needles, m.p. 115°–116° C., $\alpha_D = -8.51°$.

EXAMPLE XLVI

This example demonstrates the anti-arrhythmic activity possessed by the subject compounds of formula (A).

The right atrium of an anesthetized dog is exposed by right thoracotomy and retraction of the pericardium. Atrial fibrillation, as determined by a standard ECG limb lead, is reduced by placing two drops of a 10 percent solution of acetylcholine on the atrium and then stroking the atrium with a blunt spatula. The period of fibrillation is recorded.

Two control periods of fibrillation are produced at 15 minutes intervals. The compound to be tested is administered i.v. ten seconds after the next induction. A compound is classified as active if it decreases the period of fibrillation by at least 50 percent. In the following table, the MED (minimum effective dose) of several compounds of formula (A) are listed, it being understood that such compounds are not listed for purposes of limiting the invention thereto, but only to exemplify the useful properties of all the compounds within the scope of formula (I), including the pharmaceutically acceptable acid addition salts thereof.

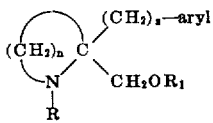

| n | z | R | R₁ | aryl | MED (mg/kg) |
|---|---|---|---|---|---|
| 4 | 1 | H | H | phenyl | 1–2.5* |
| 4 | 1 | H | H | p-Cl-phenyl | 10 |
| 4 | 1 | H | H | P-F-phenyl | 10–20 |
| 4 | 1 | H | H | 3,4-di-Cl-phenyl | 10 |
| 4 | 1 | H | H | p-MeO-phenyl | 10 |
| 4 | 1 | H | H | m-CF₃-phenyl | 10 |
| 4 | 1 | H | H | p-Me-phenyl | 5.10 |
| 5 | 1 | H | H | phenyl | 5–10 |
| 4 | 2 | H | H | phenyl | 2.5–5 |
| 4 | 1 | Me | H | phenyl | <5 |
| 4 | 1 | Bu | H | phenyl | 1–2.5 |
| 4 | 1 | H | acetyl | phenyl | 2.5–5 |
| 4 | 3 | H | H | phenyl | 2.5 |
| 4 | 2 | H | acetyl | phenyl | 10 |

*The (+) and (−) forms of this compound exhibited similar activity.

EXAMPLE XLVII

2-Phenethyl-2-piperidinemethanol acetate hydrochloride: 2-Phenethyl-2-piperidinemethanol (8.1 g., 0.037 mole) is dissolved in 200 ml. dichloromethane and 75 ml. of IN sodium hydroxide solution is added. To this rapidly stirred mixture (cooled to 0° C.) is added 3.14 g. (0.04 mole) acetyl chloride in 35 ml. of dichloromethane over a period of 15 minutes. The resulting mixture is stirred at 0° C. for 2 hours. The phases are separated and the organic phase is washed with water, dried over sodium sulfate and concentrate in vacuo yielding about 8.5 g. of a yellow oily residue which is dissolved in 250 ml. ether and treated with ethereal hydrogen chloride until precipitation is complete. The precipitate is stirred in the ether-acid mixture for 5 hours. Treatment with decolorizing carbon and two recrystallizations from methanol-ether yields the product, 2-phenethyl-2-piperidinemethanol acetate hydrochloride as a light yellow solid, m.p. 182.5°–184.5° C.

EXAMPLE XLVIII

Ethyl 1-(3-trifluoromethylphenethyl)-2-oxocyclopentane carboxylate: β-(3-Trifluoromethylphenyl)-ethanol (118 g., 0.62 mole) is dissolved in 120 ml. benzene and 136 g. (0.5 mole) phosphorous tribromide is added dropwise. The temperature slowly rises to about 58° C. but begins to fall after approximately one-third the addition. The reaction mixture is heated to 65° C. and the addition continued as the temperature is slowly increased to 75° C. Total addition time is about 1 hour. The reaction mixture is then heated to 80°–85° C. for 1 hour. Copious gas evolution is observed. The mixture is allowed to cool and then added to 1 liter of iced water, extracted with benzene and the benzene phase is washed with water, dilute sodium bicarbonate solution, and water until neutral, dried over sodium sulfate and evaporated to a colorless oil which is identified by its n.m.r. spectrum as β-(3-trifluoromethylphenyl)ethyl bromide.

The potassium salt of ethyl 2-oxocyclopentane carboxylate (84 g., 0.43 mole) is dissolved in 750 ml. dimethylsulfoxide and 76 g. (0.3 mole) of β-(3-trifluoro-methylphenyl)ethyl bromide is added over a period of 30 minutes. The resulting yellow solution is stirred overnight and then poured into 2.5 liters of iced water. The mixture is extracted with n-hexane, the organic layer washed with water, dried over magnesium sulfate and evaporated yielding about 65 g. of an oily residue. The aqueous layer is extracted with chloroform and the chloroform solution is washed with water, dried over magnesium sulfate and evaporated to yield about 28 g. of a yellow oil. The two oily residues are combined and distilled. The product, ethyl 11-(3-trifluoromethylphenethyl)-2-oxocyclopentane carboxylate, boils at 125°–175°C./0.075–0.25 mm Hg.

EXAMPLE XLIX

Ethyl 2-[β-(3-trifluoromethylphenyl)ethyl]-6-oxopipecolate: is prepared by the method described for ethyl 2-(phenethyl)-6-oxopipecolate starting with 45 g. (0.137 mole) of ethyl 1-(3-trilfuoromethylphenethyl)-2-oxoxyclopentane carboxylate and 400 ml. of hydrazoic acid solution prepared from 42 g. (0.64 mole) of NaN₃, 42 ml. of water, and 32 g. (0.32 mole) of conc. sulfuric acid in chloroform. The yield of crude lactam is about 35 g. of a yellow oil that crystallizes. Two recrystallizations from ether in a dry ice - acetone cooling bath yields the pure lactam, ethyl 2-[β-(3-trifluoromethylphenyl)ethyl]6-oxopipecolate, as a white solid, m.p. 97°–99° C.

EXAMPLE L

2-[β-(3-trifluoromethylphenyl)ethyl]-2-piperidinemethanol: A solution of 11 g. (0.032 mole) of ethyl 2-[β-(3-trifluoromethylphenyl)-ethyl]-6-oxopipecolate in 150 ml. of ether is added dropwise to a stirred suspension of 10 g. of lithium aluminum hydride in 200 ml. of ether. The mixture is heated under reflux overnight. After cooling in an ice bath, 50 ml. of water is added dropwise so that the temperature does not exceed 30° C. Stirring is continued another hour at room temperature. The inorganics are filtered off and the cake washed several times with ether. The filtrates are dried over anhydrous magnesium sulfate and concentrated in vacuo to give the crude product, 2-[β-(3-trifluoromethylphenyl) ethyl]-2-piperidinemethanol, as an oil. The hydrochloride is prepared in ether by addition of a solution of etheral hydrogen chloride. Recrystallization from methanol-ether yields the pure hydrochloride, m.p. 146°–156° C. The free base is regenerated in aqueous sodium hydroxide at pH>10 and extracted with two 50 ml. portions of methylene chloride. The combined extracts are washed with saturated brine. The methylene chloride phase is dried over anhydrous magnesium sulfate, filtered, and the filtrate concentrated in vacuo to give the free base as an oil which crystallizes from 50 ml. of hexane and is recrystallized from an additional volume of hexane to yield the pure free base, 2-[β-(3-trifluoromethyl-phenyl) ethyl]-2-piperidinemethanol, m.p. 69°–72° C.

Anal. Calc'd. for $C_{15}H_{20}F_3NO$: C, 62.70; H, 7.02; N, 4.87 percent.

Found: C, 62.44; H, 6.80; N, 4.96 percent.

EXAMPLE LI

Ethyl 1-(p-fluorophenethyl)-2-oxoxyclopentane carboxylate: β-(4-fluorophenyl)-ethanol (39 g., 0.28 mole) is dissolved in 50 ml. benzene and cooled to 5°C. Phosphorous tribromide (57 g., 0.21 mole) is slowly added keeping the temperature between 5° C. and 10° C. The reaction mixture is allowed to stir for 1 hour and then heated to reflux for 1 hour. The mixture is then cooled and poured into iced water, extracted with benzene and the benzene extract washed with dilute sodium bicarbonate solution and water, dried over magnesium sulfate and evaporated to yield about 46 g. of a yellow oil which is identified by its n.m.r. spectrum as β-(4-fluorophenyl)ethyl bromide.

48.5 Grams (0.25 mole) of the potassium salt of ethyl 2-oxocyclopentane carboxylate are dissolved in 500 ml. dimethyl sulfoxide and to this solution is added 46 g. (0.23 mole) of β-(4-fluorophenyl)ethyl bromide over a period of 30 minutes. The mixture is stirred overnight and then poured into 1 liter of iced water and extracted with n-hexane. The extract is washed well with water, dried over magnesium sulfate and evaporated to a light pink liquid which is then distilled to yield about 31 g. of ethyl 1-(p-fluorophenethyl)-2-oxocyclopentane carboxylate as a colorless oil, b.p. 145°–165° C. at .02–.03 mm Hg.

EXAMPLE LII

Ethyl 2-(4-fluorophenethyl)-6-oxopipecolate: A hydrazoic acid solution is prepared from 40 gm (0.6 mole) sodium azide, 25 gm sulfuric acid, and 40 gm water in 100 ml. chloroform. This solution is dried over magnesium sulfate, mixed with a solution of 25 gm (0.09 mole) of ethyl 1-(p-fluorophenethyl)-2-oxocyclopentane carboxylate in 100 ml. chloroform and the combined solution cooled to 0°C. This combined solution is added over a period of ½ hour to a rapidly stirred mixture of 100 ml. sulfuric acid and 200 ml. chloroform held at −15° to −10°C. The color changes from colorless through light yellow to green-yellow. The mixture is cooled to −20°C. and stirred an additional 10 minutes. The phases are separated and the color is all contained in the acid layer which is added to 1 liter ice water, stirred for 15 minutes and extracted with ether. The extract is washed with dilute sodium hydroxide and water until neutral, dried over magnesium sulfate and evaporated yielding a gummy white solid, which is crystallized from hexane and chloroform yielding ethyl 2-(4-fluorophenethyl)-6-oxopipecolate as a glistening white solid, m.p. 98.5°–100° C.

EXAMPLE LIII

2-[β-(4-fluorophenyl)ethyl]-2-piperidinemethanol hydrochloride is prepared by following the procedure of Example L using 10.2 g. (0.035 mole) of ethyl 2-(4-fluorophenethyl)-6-oxopipecolate and 10 g. of lithium aluminum hydride in 350 ml. of ether. The hydrochloride, after recrystallization from methanol-ether is a white solid, m.p. 179°–181° C.

EXAMPLE LIV

8a-Phenethyl-3H-oxazalo[3,4a]piperidine: 2-phenethyl-2-piperidine methanol (8 g., 0.036 mole) is suspended in 50 ml. water and the pH adjusted to 4 by the addition of conc. hydrochloric acid. To this pale yellow solution is added 200 ml. of 37 percent formaldehyde solution and the resulting solution heated on a steam bath for 3.5 hours. The solution is cooled and washed three times with 300 ml. ether, basified and extracted three times with 300 ml. ether. The combined ether extracts are washed with water until neutral and dried over sodium sulfate. The ether is evaporated yielding about 7.5 gm of 8a-phenethyl-3H-oxazalo[3,4a]piperidine as a pale yellow oil which is used without further purification in the next example.

EXAMPLE LV

1-Methyl-2-phenethyl-2-piperidinemethanol: To a stirred suspension of lithium aluminum hydride (8 g., (0.21 mole) in 400 ml. ether is added with stirring over a period of 15 minutes a solution of 7.5 g. (.032 mole) of 8a-phenethyl-3H-oxazalo[3,4a]piperidine in 100 ml. ether. This suspension is stirred overnight and the excess hydride is destroyed by cautiously adding 32 ml. water and anhydrous sodium sulfate. The suspension is filtered and the colorless filtrate is evaporated to yield about 7 g. of 1-methyl-2-phenethyl-2-piperidinemethanol as a colorless oil. The hydrochloride salt is prepared by adding ethereal hydrogen chloride to an ether solution of the base. The hydrochloride is recrystallized once from methanol-ether and a second time from isopropyl alcohol, m.p. 172°–182° C.

EXAMPLE LVI

Ethyl 1-(3-phenylpropyl)-2-oxocyclopentane carboxylate: To a solution of 29.1 g. (0.15 mole) of the potassium salt of ethyl 2-oxocyclopentane carboxylate in 300 ml. of dimethylsulfoxide is added dropwise over a period of one hour 31.7 g. (0.16 mole) of 3-phenpropyl bromide with stirring. The mixture is stirred overnight at room temperature and then added to one liter of ice water, extracted with hexane, the extract dried over anhydrous magnesium sulfate and concentrated in vacuo yielding about 36 g. of ethyl 1-(3-phenylpropyl)-2-oxocyclopentane carboxylate, b.p. 158°–160°/0.7 mm Hg.

EXAMPLE LVII

Ethyl 2-(3-phenylpropyl)-6-oxopipecolate: A chloroform solution of hydrazoic acid is prepared from 32.5 g. (0.5 mole) of sodium azide in the usual manner. To this solution is added 34.25 g. (0.125 mole) of ethyl 1-(3-phenylpropyl)-2-oxocyclopentane carboxylate in 100 ml. of chloroform. The mixture is added over a one hour period with rapid stirring to a mixture of 200 ml. of chloroform and 100 ml. of concentrated sulfuric acid at −20°C. After the addition is complete, the mixture is allowed to warm to 31 10°C., the phases separated, and the sulfuric acid phase washed once with benzene. The sulfuric acid phase is added to 600 g. of ice and stirred for one hour. The product is extracted with benzene and washed with dilute sodium hydroxide. The benzene solution is dried over anhydrous magnesium sulfate and evaporated in vacuo to yield about 16.5 g. of a pale yellow oil. Ethyl 2-(3-phenylpropyl)-6-oxopipecolate is crystallized from ether at −78°C., m.p. 62°–64 C.

EXAMPLE LVIII 2-(3-Phenylpropyl)-2-piperidinemethanol: 9 Grams (.031 mole) of ethyl 2-(3-phenylpropyl)6-oxopipecolate is dissolved in 150 ml. dimethoxyethane and added to a stirred suspension of 4.5 g. (0.12 mole) lithium aluminum hydride in 150 ml. dimethoxyethane during 15 minutes. The mixture is heated to reflux for 4.5 hours, cooled to 10° C. and 18 ml. water added slowly. The resulting viscous mixture is allowed to stir until completely white and filtered. The clear colorless filtrate is evaporated to a colorless oil which solidifies on standing to yield about 6.5 g. of a white solid, m.p. 78°–82 C. This solid is crystallized from ether at room temp. by dissolving it in an excess of ether and then evaporating the ether until there is approximately 8 ml. of solvent for each gram of material. The product, 2-(3-phenylpropyl)-2-piperidinemethanol, crystallized in this way melts at 89°–90.5° C.

What is claimed is:

1. A lower alkyl 2-aralkyl-methylenimine-2-carboxylate having the formula:

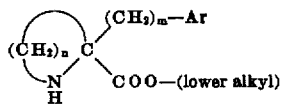

wherein $n$ is the integer 4 or 5, $m$ is the integer 1 or 2, and Ar is a member selected from the group consisting of phenyl, halophenyl, lower alkylphenyl and lower alkoxyphenyl, said halo function being a halogen of atomic weight less than 80.

2. Lower alkyl 2-benzylpipecolate.
3. Ethyl 2-benzylpipecolate.